(12) United States Patent
Lau

(10) Patent No.: US 7,743,125 B1
(45) Date of Patent: Jun. 22, 2010

(54) COMPUTER MULTIPLE COMMUNICATIONS PORT UNIT

(75) Inventor: Pui Lun Lau, Farmington, CT (US)

(73) Assignee: General Electric Company, Schenectady, NY (US)

( * ) Notice: Subject to any disclaimer, the term of this patent is extended or adjusted under 35 U.S.C. 154(b) by 911 days.

(21) Appl. No.: 09/708,492

(22) Filed: Nov. 9, 2000

(51) Int. Cl.
*G06F 15/173* (2006.01)

(52) U.S. Cl. ..................................... 709/223

(58) Field of Classification Search ............... 709/227, 709/228, 203, 209, 220, 230, 213, 223, 226, 709/238; 370/398, 395.6, 355, 407, 396, 370/352, 357, 401, 380; 700/293; 361/81, 361/111; 379/93; 455/15; 345/734
See application file for complete search history.

(56) References Cited

U.S. PATENT DOCUMENTS

| | | | | |
|---|---|---|---|---|
| 4,528,611 A * | 7/1985 | Udren | ............................ | 361/81 |
| 4,644,440 A * | 2/1987 | Kenny et al. | ................. | 361/111 |
| 4,937,817 A * | 6/1990 | Lin | ............................... | 370/416 |
| 5,287,461 A * | 2/1994 | Moore | .......................... | 709/219 |
| 5,355,375 A * | 10/1994 | Christensen | ................. | 370/407 |
| 5,548,802 A * | 8/1996 | Barnes et al. | .................. | 455/15 |
| 5,555,543 A * | 9/1996 | Grohoski et al. | ............. | 709/209 |
| 5,625,678 A * | 4/1997 | Blomfield-Brown | ...... | 379/93.08 |
| 5,627,766 A * | 5/1997 | Beaven | ........................ | 709/224 |
| 5,680,324 A * | 10/1997 | Schweitzer et al. | .......... | 370/241 |
| 5,761,084 A * | 6/1998 | Edwards | ....................... | 700/293 |
| 5,781,549 A * | 7/1998 | Dai | .............................. | 370/398 |
| 5,825,772 A * | 10/1998 | Dobbins et al. | .............. | 370/396 |
| 5,862,338 A * | 1/1999 | Walker et al. | ................. | 709/224 |
| 5,864,554 A * | 1/1999 | Rostoker et al. | .......... | 370/395.6 |
| 5,903,559 A * | 5/1999 | Acharya et al. | .............. | 370/355 |
| 6,189,043 B1 * | 2/2001 | Buyukkoc et al. | ............ | 709/241 |
| 6,222,714 B1 * | 4/2001 | Hoffman | .................... | 361/93.2 |
| 6,229,538 B1 * | 5/2001 | McIntyre et al. | ............. | 345/734 |
| 6,285,656 B1 * | 9/2001 | Chaganty et al. | ............ | 370/228 |
| 6,393,483 B1 * | 5/2002 | Latif et al. | ................... | 709/226 |
| 6,426,952 B1 * | 7/2002 | Francis et al. | ................ | 370/380 |
| 6,591,314 B1 * | 7/2003 | Colbath | ........................ | 710/36 |
| 6,633,998 B1 | 10/2003 | Lau | | |
| 6,651,190 B1 * | 11/2003 | Worley et al. | ................... | 714/43 |
| 6,850,531 B1 * | 2/2005 | Rao et al. | .................... | 370/401 |
| 7,085,938 B1 * | 8/2006 | Pozzuoli et al. | ............. | 713/300 |
| 7,342,897 B1 * | 3/2008 | Nader et al. | ................ | 709/203 |

\* cited by examiner

*Primary Examiner*—Benjamin R Bruckart
(74) *Attorney, Agent, or Firm*—GE Global Patent Opertation; Roger C. Phillips

(57) ABSTRACT

A multiple port unit includes plural peripheral communications ports and two network ports for connect the peripheral devices with at least one remote controlling computer. Multiple port unit further includes a controller which interrogates network links coupled to the network ports and alternately switching network links. The controller also interrogates computers coupled to the network links and ascertains that a computer controlling devices coupled to the communication ports is working properly.

18 Claims, 3 Drawing Sheets

COMPUTER MULTIPLE COMMUNICATIONS PORT UNIT

FIELD OF THE INVENTION

The invention relates to networked intelligent electronic devices and more particularly, to a multiple communications port unit for coupling plural intelligent electronic devices to computers over a network connection.

BACKGROUND OF THE INVENTION

Protective relays are commonly used to protect electrical power distribution systems. A simple protective relay can be an electro-mechanical contact relay having an energizing circuit coupled to the load on an electric power distribution line. When the load on a portion of the system exceeds certain parameters, i.e., a fault is present, the relay is energized to operate a circuit breaker or the like coupled to the power distribution line to thereby isolate a portion of the electrical distribution system having the fault. The contacts of the relay can perform various functions such as tripping a circuit breaker, generating an alarm or providing a signal to another protective relay. For the most part, such simple relays only provide the contact operation as an output. They do not provide any other indication of the conditions which produced activity in the output contacts.

For instance, the principal of operation of a distance measuring relay is that the distance of a fault can be determined by a comparison of the complex impedance of the line derived from the current and voltage at the relay to a reach characteristic. If this comparison indicates that there is a fault within the protection zone of the relay, a trip contact is actuated. Accordingly, "intelligent relays" have been developed having microprocessors capable of evaluating complex impedance or other variables to protect the electrical distribution system by isolating faults and to transmit diagnostic data and the like to computers or other devices for evaluation and display purposes. Typically, substations in an electric power distribution system have many protective relays. The intelligent relays can be programmed to perform various protection functions. For instance, digital distance relays and overcurrent relays are in use. These relays are capable of providing a great deal of information. For instance, data indicating the location of the fault, and the current and voltage at the fault are available from intelligent distance relays. Similarly, current information is available from an intelligent overcurrent relay. This information is often transmitted to a remote computer for control and report generation. Conventionally, this is accomplished over an RS-232 channel or other serial communications channel for each relay. In addition to relays, other intelligent electronic devices, i.e. control devices having microprocessors capable of executing commands and/or collecting data, have been developed.

Accordingly, multiple serial port units are utilized to couple multitudes of intelligent electronic devices to remote a computer. Such units include multiple serial ports, 8 for example, and a single Ethernet port for coupling the serial ports to a network communications link. The Ethernet port is coupled to a computer using standard cables and protocols, e.g. a twisted pair. The serial ports are each connected to an intelligent electronic device. The multiple serial port unit uses known hardware and software to map the serial ports over the Ethernet connection to appear as local serial ports to the computer. Accordingly plural intelligent protective relays can be coupled to a computer over a great distance by an Ethernet connection.

However, intelligent electronic devices and associated computer systems are applied under hazardous conditions. Particularly, electrical distribution systems are inherently in environments that include temperature changes, high EMF, and other environmental hazards. Accordingly, computers, network connections, and other components often fail intermittently or permanently in electrical distribution systems. If a computer or network connection over which an intelligent protective relay is communicating fails, the operator may not have control of devices such as circuit breakers, disconnect switches, and the like. Also, the operator might not know the status of their devices and may lose centralized control of an entire substation. Accordingly, the protective relay may not function properly and equipment damage or injury of personnel may result. Accordingly, there is a need for failure tolerance in a control system for protective relays in an electric power distribution system.

It is known to provide network failure tolerance using redundant computers i.e., servers, and to switch over to a backup computer when a primary computer fails. Also, it is known to send separate packets of data over different paths in an Ethernet connection. However, these systems and methods are not truly redundant because they rely on the computers for fault detection and a single Ethernet connection for communications.

SUMMARY OF THE INVENTION

Accordingly, the present invention relates to a multiple port unit adapted for coupling two or more networked computers to multiple peripheral devices through one or more network connections, wherein the multiple port unit monitors the status of the network connections and the coupled computers and maintains communication with at least one of the computers via a selected link.

More specifically, the present invention relates to a multiple port unit having at least one redundant power supply module, multiple peripheral communication ports for communicating with peripheral devices, at least two network ports for connection with one or more network hubs, through which remote control computers are networked, and a control unit configured to monitor communication links through the network ports and select a desired link for communication with the remote control computers to thereby coupling the peripheral devices to the remote control computers.

Another aspect of the present invention relates to a method for coupling a plurality of peripheral devices to a plurality of remote control computers via a plurality of network connections. The method includes the process of monitoring the status of each of the remote control computers and of each of the network connections, and selectively switching one network connection to another at a pre-selected interval or as a result of the monitored status of the remote control computers or network connections.

The present invention provides significant advantages over prior art devices and methods. For example, the present invention has a redundancy coupling between the peripheral devices and the remote control computers. The present invention also includes periodic testing of communication links to detect malfunction and repair.

Additional advantages of the present invention will become readily apparent to those skilled in the art from the following detailed description, wherein only the preferred embodiment of the invention is shown and described, simply by way of illustration of the best mode contemplated for carrying out the present invention. As will be realized, the present invention is capable of other and different embodiments, and its several details are capable of modification in various obvious aspects, all without departing from the present invention. Accordingly, the drawings and description are to be regarded as illustrative in nature, and not as restrictive.

BRIEF DESCRIPTION OF THE DRAWING

Reference is made to the attached drawings, wherein elements having the same reference numeral designations represent like element throughout, and wherein.

DETAILED DESCRIPTION OF THE PREFERRED EMBODIMENT

The present invention addresses and solves problems related to the coupling of intelligent electronic devices to one or more remote control computers. More particularly, the present invention relates to a multiple serial port unit which provide a plurality of serial ports connected to the intelligent electronic devices, and which maps the serial ports as communication ports of the remote control computers though redundant communication links.

Figure 1:
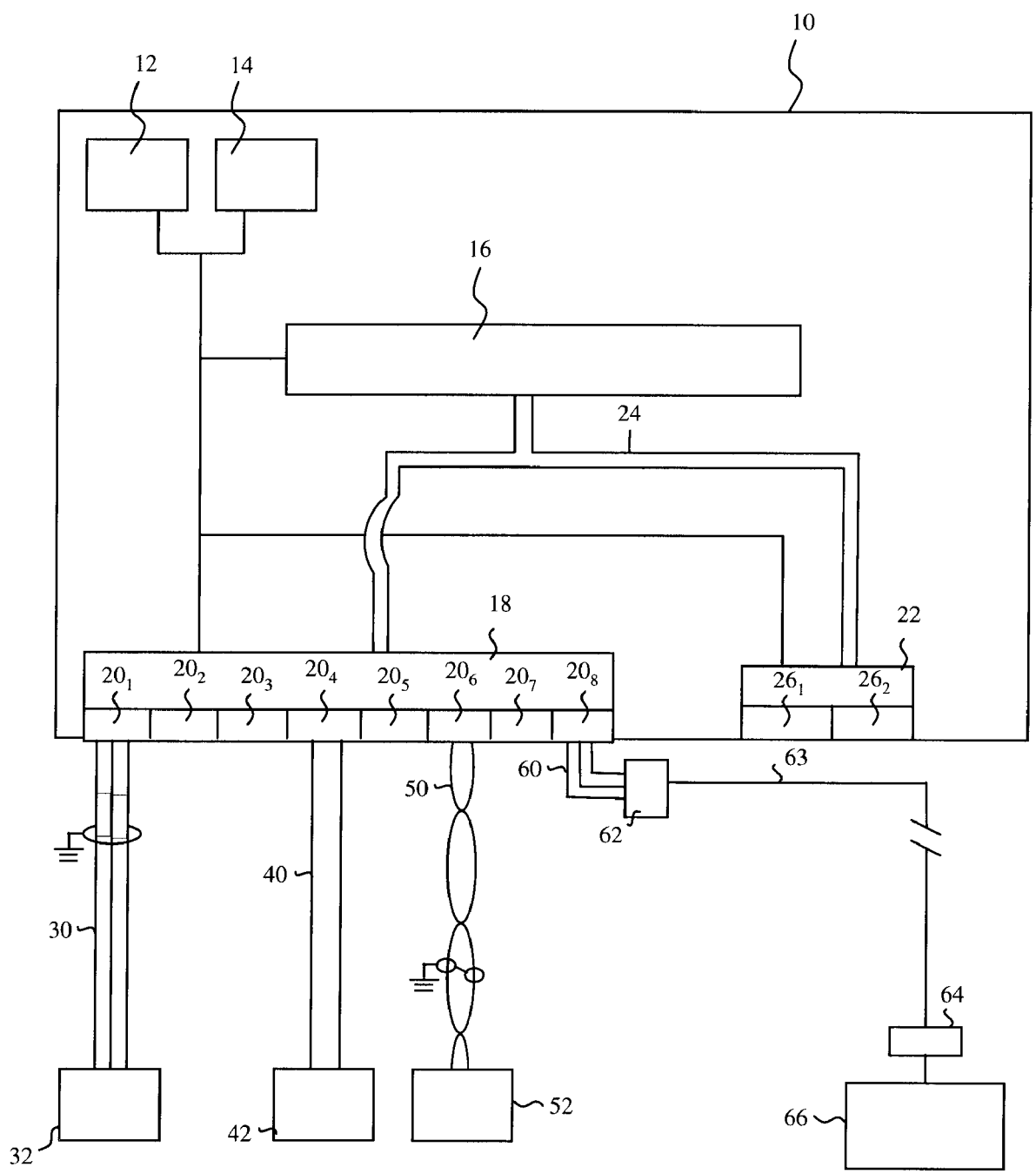
FIG. 1 illustrates a block diagram of the multiple port unit of the preferred embodiment.

A preferred embodiment of the invention is schematically illustrated in FIG. 1, which is a multiple port unit 10. Multiple port unit 10 includes power supplies 12 and 14 configured in parallel to operate in a redundant manner. If one of power supplies 12 and 14 fails, the other can function at least temporarily as the sole power supply for multiple port unit 10. A relay contact or other sensing and communication arrangement can be provided to permit indication of a failed power supply to be communicated for alarm or report generation. Power supplies 12 and 14 are coupled to other components of multiple port unit 10 discussed below in an appropriate manner to provide electrical power to the components at the desired voltage and current levels. However, for simplicity of illustration, only a schematic connection between power supplies 12 and 14 and the other components is illustrated.

Processor 16 includes a central processing unit (CPU) and memory. The memory can be of any type including flash memory and EPROM. Processor 16 of the preferred embodiment is a digital device. However, processor 16 can be analog or any arrangement for accomplishing the interrogation routine and other functions described below. Processor 16 can be programmed using known programming languages and methods to accomplish the desired functions.

Communications port module 18 includes interface circuitry and sixteen physical communications ports $20_1$-$20_{16}$, (only eight of which are illustrated) such as RS232, RS485, or fiber optic serial ports. Ports $20_1$-$20_{16}$ each include an appropriate connector, such as a 9-pin D-type connector (DB-9) in the case of RS232 ports, 2 and 4 wire terminal blocks in the case of RS485 ports, and ST connectors in the case of fiber optic serial ports. Alternatively, all or some of ports $20_1$-$20_{16}$ can be Universal Serial Bus (USB) ports. Each of ports $20_1$-$20_{16}$ can be of the same type. Alternatively, ports $20_1$-$20_{16}$ can be of any combination of different types, i.e standards and protocols, of ports depending on the type of intelligent electronic devices to be coupled to multiple port unit 10.

FIG. 1 illustrates examples of the types of ports and the corresponding connection to an intelligent electronic device. Port $20_1$ is an RS232 port coupled by 3 wire copper cable 30 to intelligent electronic device 32. Port $20_4$ is a fiber optic RS232 port and is coupled by a two optical fibers 40 to intelligent electronic device 42. Port $20_6$ is an RS485 port and is coupled by twisted pair copper cable 50 to intelligent electronic device 52. Port $20_8$ is an RS232 port and is coupled to intelligent electronic device 66 by modem 62, phone line 63 (POTS), and modem 64. Of course, communications port module 18 can include buffer memory, isolating circuits, signal conditioning circuits, and any other known hardware or software to accomplish the disclosed functions.

Network module 22 includes interface circuitry and two network communications ports $26_1$ and $26_2$, which are Ethernet ports in the preferred embodiment. Network communications ports $26_1$ and $26_2$ can include UTP connectors for 10 base-T or 100 base-T Ethernet communications over a twisted pair or can include an ST connector for fiber optic Ethernet communications over optical fibers. Of course, network module 22 can include buffer memory, isolating circuits, signal conditioning circuits, and any other known hardware or software to accomplish the disclosed functions. Network module 22, communications module 18, and processor 16 are communicatively coupled via data bus 24 which can be of any appropriate type, such as an Industry Standard Architecture (ISA), VESA Local Bus (VLB) Peripheral Component Interconnect (PCI) bus, AU Port or S Bus.

Figure 2:
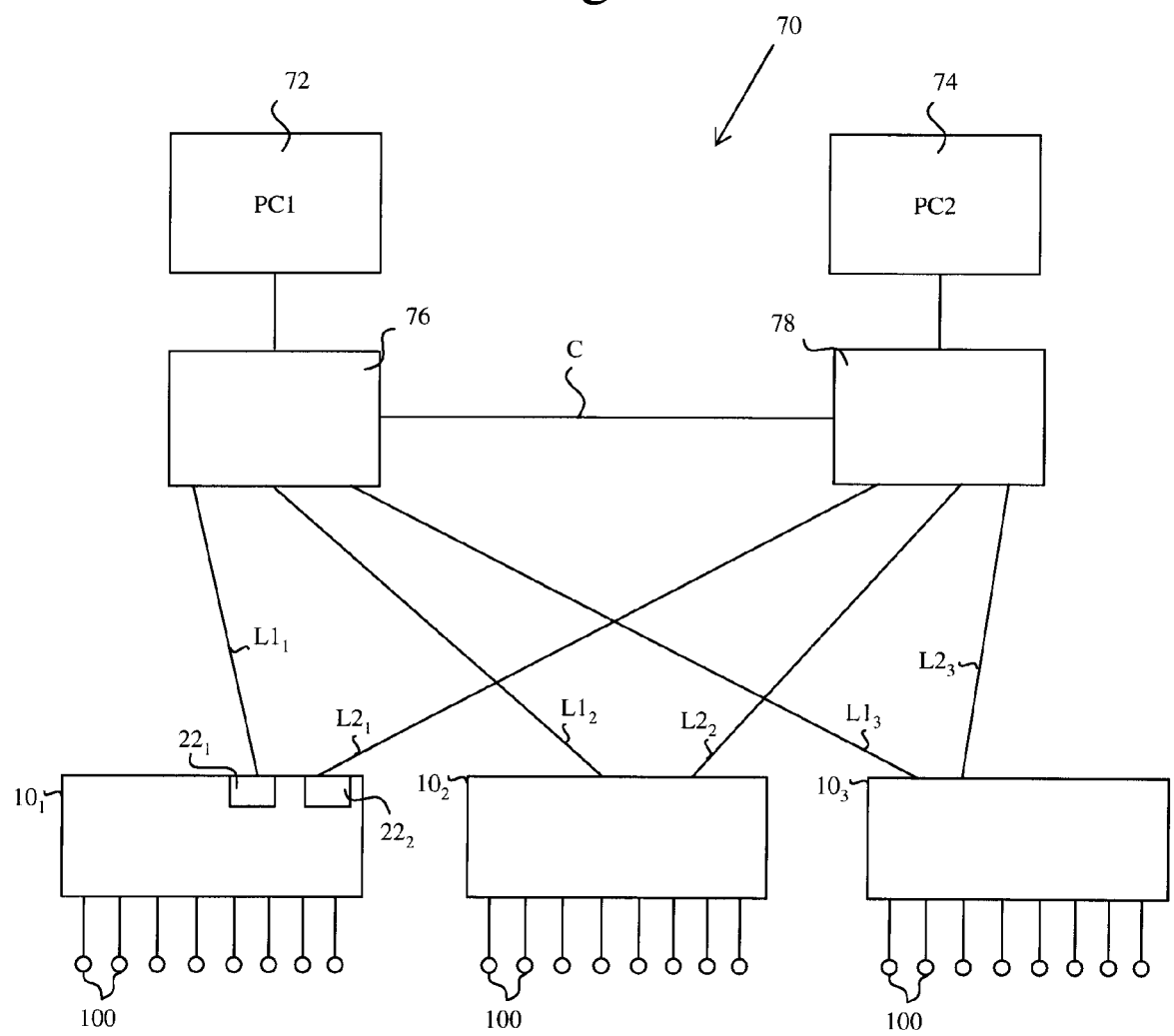
FIG. 2 illustrates a block diagram of a system architecture according to the preferred embodiment using the multiple port unit of FIG. 1.

FIG. 2 is a block diagram of a typical computer architecture 70 incorporating plural multiple port units $10_1$, $10_2$, and $10_3$. Architecture 70 includes two control computers 72 and 74 each running a supervisory control program for a plurality of intelligent electronic devices in a redundant manner. The control program can include instructions to control various devices and/or to exchange data with various devices. Computers 72 and 74 can each be a personal computer, a minicomputer, a programmable logic controller, or any other computer capable of supervisory control. In the preferred embodiment, computer 72 is a personal computer (PC1) and computer 74 is a personal computer (PC2). Computer 72 is coupled to Ethernet hub 76 and computer 74 is coupled to Ethernet hub 78. Hubs 76 and 78 are coupled to one another by Ethernet connection C, which can be accomplished over a twisted pair, optical fiber 10 base 2, or the like.

Three multiple port units $10_1$, $10_2$, and $10_3$, are similar to multiple port unit 10 described above and are coupled to each hub over a separate Ethernet connection. In particular, multiple port unit $10_1$ is coupled to hub 76 by Ethernet port $22_1$ and link $L1_1$, which can be a twisted pair cable, optical fiber, or the like. Alternatively multiple port unit $10_1$ can be coupled to computer 74 via hub 78 by Ethernet port 22, link $L1_1$, hub 76, connection C, and hub 78. Similarly, multiple port unit $10_1$ is coupled to computer 74 via hub 78 by Ethernet port $22_2$ and link $L2_1$, which can be a twisted pair cable, optical fiber, or the like. Multiple port units $10_2$, and $10_3$ are coupled to hubs 76 and 78 in a similar manner. Corresponding links are labeled with like reference numerals distinguished by the subscript ("1" for multiple port unit $10_1$, "2" for multiple port unit $10_2$, and "3" for multiple port unit $10_3$). Intelligent electronic devices 100 (only some of which are labeled in FIG. 2) are coupled to communication ports $20_1$-$20_8$ of multiple port units $10_1$, $10_2$, and $10_3$, in the manner described above.

Links $L1_1$ and $L2_1$ are separate Ethernet connections running a separate carrier and separate data packets. Accordingly, the phrase communication link or the word link, as used herein, refers to a communications connection having a carrier and data packets.

Each of communication ports $20_1$-$20_{16}$ of each multiple port units $10_1$, $10_2$ and $10_3$ corresponds to a serial communication channel in the preferred embodiment and can be mapped as a COMM port on computers 72 and 74 via TCP/IP over the Ethernet links $L_1$ and $L_2$. Accordingly, each intelligent electronic device can be controlled by, or exchange data with, each of computers 72 and 74. At any given time, the COMM ports can be used by only one of computers 72 and 74. Accordingly, one of computers 72 and 74 is initially configured as the active computer and thereafter an active computer is selected based on interrogation by multiple port units $10_1$, $10_2$, and $10_3$ in the manner described below. In the preferred embodiment, we will assume that computer 72 is set to be the initial active computer. The control program on the active computer can open local COMM ports, which are mapped into the serial communication channels of multiple port units $10_1$, $10_2$ and $10_3$. Accordingly, the active computer can communicate with the intelligent electronic devices as if they were available locally.

Each of multiple port units $10_1$, $10_2$, and $10_3$ periodically interrogates computers 72 and 74 to ascertain their operating status and to switch the active computer if necessary. Also, multiple port units $10_1$, $10_2$, and $10_3$ periodically switch between links L1 and L2 to test the integrity of both links. If either of links L1 and L2 fails, multiple port unit 10 will send an alarm to computer 72 and/or 74. Therefore, the possibility of switching to a defective link is minimized.

Figure 3:
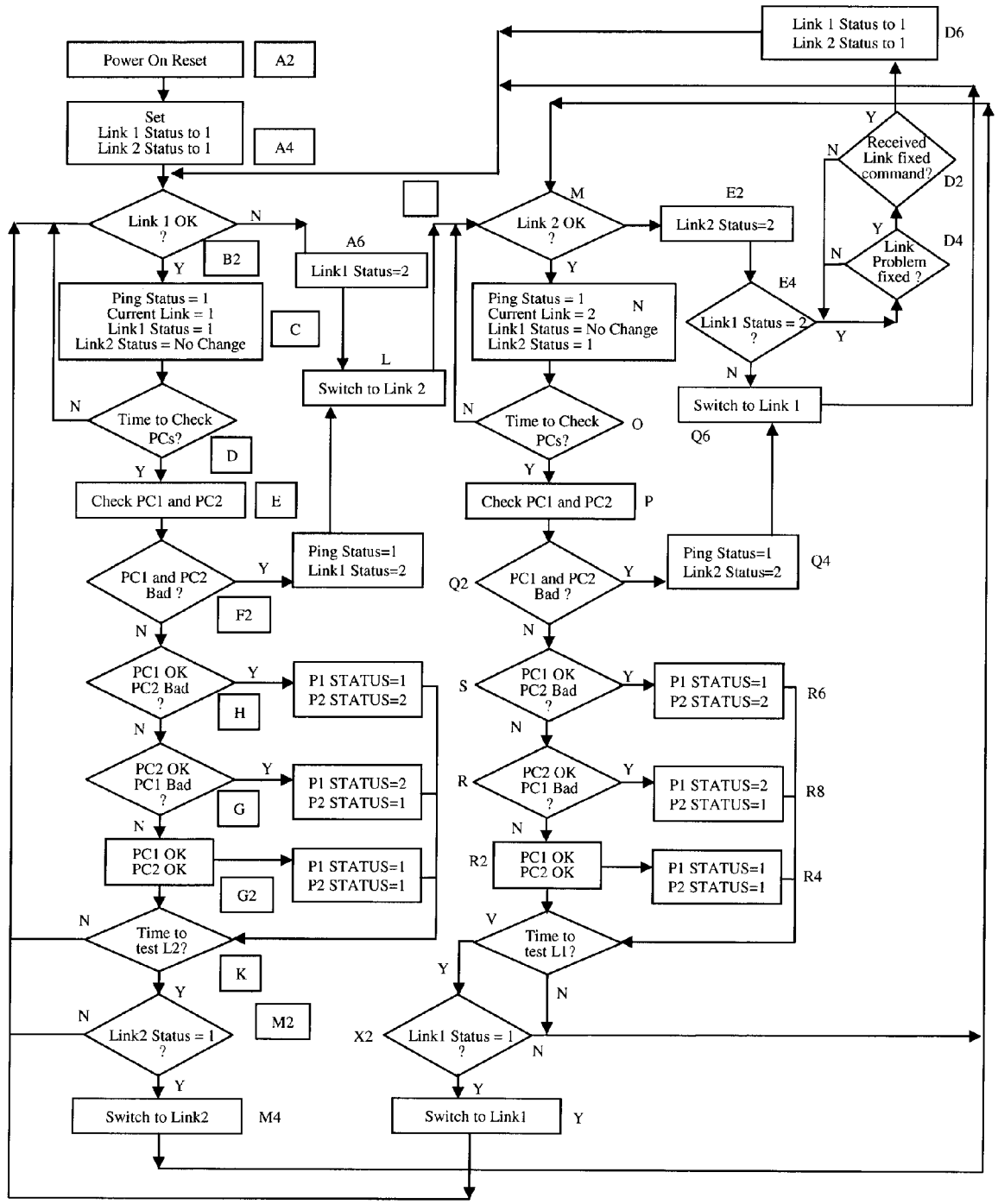
FIG. 3 illustrates a flow chart of an interrogation routine of the preferred embodiment.

FIG. 3 is a flowchart of the interrogation and control routine carried out by processor 16 of one of multiple port units $10_1$, $10_2$, and $10_3$. A similar routine is carried out by each of the multiple port units $10_1$, $10_2$, and $10_3$ and thus the routine is only discussed in detail with respect to one of the multiple port units $10_1$, $10_2$, and $10_3$, referred to generally as multiple port unit 10 below.

In FIG. 3, steps A2 and A4, the link status variables Link1Status and Link2Status are reset to 1, indicating that both link L1 and link L2 are operational, during either a power up reset of multiple port unit 10 or through an external reset command, not shown. Specifically, a memory location in processor 16 corresponding to these variables is set to 1 indicating that each of links L1 and L2 are operational. Multiple port unit 10 will then perform an integrity check of link L1 by detecting the Ethernet carrier or Ethernet Link Pulses in step B2. If no Link Pulses are present, then the multiple port unit 10 sets Link1Status to 2 in step A6, to indicate that link L1 is bad, and multiple port unit 10 switches to link L2 in step L. If Link Pulses are present, multiple port unit 10 sets a Ping Status variable to 1 in step C. Further in step C, multiple port unit 10 sets Current Link variable to 1 to indicate that link L1 is in use, and variable Link1Status will remain at 1.

In step D, processor 16 determines if it is time to interrogate or "PING" (Packet Internet Groper) computers 72 and 74, i.e. PC1 and PC2, respectively, based on a predetermined interrogation period. For example, processor 16 of the multiple port unit 10 can be programmed to interrogate computers 72 and 74 every 3 seconds. If it is time to interrogate computers 72 and 74, the routine proceeds to step E where processor 16 causes a packet to be sent to the IP address corresponding to each of computers 72 and 74 over link L1. If a reply is received, the corresponding computer 72 or 74 is deemed to be "OK", i.e. operating properly. If no reply is received from one of computers 72 or 74, that computer is deemed to be "bad", i.e. not operating properly.

More specifically, in the routine for checking the status of computers PC1 and PC2 in step E, multiple port unit 10 asks for the number of seconds since midnight from PC1 and PC2. This value should change each time multiple port unit 10 interrogates PC1 and PC2 for this information. When checking for the status of PC1, if the value obtained from PC1 is greater than a previous value, then multiple port unit 10 will set PC1Status to 1, as shown in step G4 or G6, indicating that PC1 is on line. If the multiple port unit 10 cannot get a value from PC1, then the multiple port unit 10 will set the value of PC1Status to 2 indicating that PC1 cannot be reached.

Similarly, if the value obtained by multiple ports unit 10 from PC2 is greater than a previous value, multiple port unit 10 will set the PC2Status to 1, as shown in step G4 or G8, indicating PC2 is on line. If multiple port unit 10 cannot get a value from PC2, then multiple port unit 10 will set PC2Status to 2 in step G6 indicating that PC2 cannot be reached.

If neither PC1 nor PC2 can be reached, as determined in step F2, multiple port unit 10 will set Link1Status variable to 2 in step B4 indicating that link L1 is bad. Multiple port unit 10 then will switch to link L2 in step L.

The determination in steps F2, H, and G is based on the results of the interrogation step E. If at least one computer can be reached, then link L1 is working properly. If link L1 is working properly, multiple port unit 10 will continue to use link L1, and the routine loops back from step G4, G6, or G8 to step B2 until step K determines it is time to test link L2.

If step K determines that it is time to test link L2, i.e. a preset time for switching links has elapsed, multiple port unit 10 first checks to see if Link2Status variable has been set to 2.

If Link2Status has been set to 2, it indicates that link L2 is bad and switching over to link L2 is not permitted. If Link2Status has been set to 1, as determined in step M2, it indicates that link L2 is operational and switching to link L2 is executed in step M4. In the process of switching to link L2, multiple port unit 10 checks for Ethernet Link pulses in link L2 in step M.

If no Link Pulses are present in link L2, as tested in step M, then multiple port unit 10 sets Link2Status to 2 in step E2 indicating that link L2 is not operational. If link L2 is bad, multiple port unit will check the status of link L1 in step E4 to find a working link to connect to a working computer. If link L1 is also bad, then multiple port unit 10 waits in step D2 for a Linkfixed command from a DDE Client (not shown in the flow chart). When the bad links are determined to be repaired in step D4, the routine moves on to resetting the status of links L1 and L2 by setting Link1Status and Link2Status to 1 indicating that the links are operational. Once the links are repaired the routine will switch multiple port unit to link L1 by returning to step B2.

If Link Pulses are present on link L2, as determined in step M, then multiple port unit 10 sets Ping Status variable to 1 in step N. Also in step N, multiple port unit 10 sets variable Current Link to 2 indicating link L2 is in use, Link1Status to "No Change", and Link2Status to 1. Following step N, the routine checks to see if it is time for verifying the status of computers PC1 and PC2 in step O. Step O is identical to step D described above for link L1.

When it is time to check computer PC1 and PC2, multiple port unit 10 asks for the number of seconds since midnight from PC1 and PC2 in step P. This value should change each time the multiple port unit 10 interrogates PC1 and PC2 for this information. When checking for the status of PC1, if the value obtained from PC1 is greater than a previous value, then multiple port unit 10 will set PC1Status variable to 1, as shown in step G4 or G6, indicating that PC1 is on line. If the multiple port unit 10 cannot get a value from PC1, then multiple port unit 10 will set the value of PC1Status to 2 indicating that PC1 cannot be reached.

Following step P are steps Q2, S, R, R2, R4, R6, and R8, which are the steps wherein multiple port unit 10 interrogates and controls computers 72 and 74 over link L2 in a manner similar to the interrogation and control conducted over link L1 in steps, F2, H, G, G2, G4, G6, and G8 described in detail above. Accordingly, steps Q2, S, R, R2, R4, R6, and R8 are not described in further detail. The determination in steps Q2, S, and R is based on the result of the interrogation in step P.

In step Q2, if computers 72 and 74, i.e. PC1 and PC2, are determined to be bad, the procedure will set Ping Status to 1 and Link2Status to 2 indicating that link L2 is bad. Multiple port unit 10 will then switches over to link L1 in step Q6, thereby repeating the above-described routine starting at step B2 for link L1.

If at least one computer can be reached in step P, then link L2 is working properly. If link L2 is working properly, the multiple port unit 10 will continue to use link L2, and the routine loops back from step R4, R6, or R8 to step M, until step V determines it is time to test link L1.

If step V determines that it is time to test link L1, i.e. a preset time for switching links has elapsed, multiple port unit 10 checks to see if Link1Status variable has been set to 2 in step X2.

If Link1Status has been set to 2, it indicates that link L1 is bad and switching over to link L1 is not permitted. If Link2Status has been set to 1, as determined in step V, it indicates that link L1 is operational and switching to link L1 is executed in step Y. In the process of switching to link L1, multiple port unit 10 checks for Ethernet Link Pulses in link L1 in step B2, where the above-described routine repeats itself.

The routine described above is carried out by each of multiple port units $10_1$, $10_2$, and $10_3$, in a continuous manner. The routine serves to interrogate each of computers 72 and 74 of their operating status over each of links L1 and L2. If a primary computer does not respond, failure to the other computer is accomplished. Periodically, the Ethernet link is switched and computers 72 and 74 are interrogated again. The routine insures that a working link is used for communications between intelligent electronic devices 100 and computers 72 and 74 and that the primary computer is always OK and updated with all operating variables. Because the interrogation routine and control is carried out by the multiple port units, the interrogation routine does not rely on the integrity of the links or the computers for accuracy.

Interrogation of computers in the preferred embodiment is accomplished by pinging. However, any method of computer interrogation can be used. Interrogation of link status is accomplished by carrier detection, however any method of link interrogation can be used.

Each control computer, e.g. computers 72 and 74, connected to multiple port units 10 comprises a Dynamic Data Exchange (DDE) service that stores and communicates necessary information to each other and to multiple port units 10 so as to inform controlling architecture 70 the connectivity and operational status data of the computers and links.

Any type of device can be coupled to the communication ports. The communication ports can be of any type. There can be any number of communication ports in each multiple port unit and there can be any number of multiple port units in the architecture subject to addressing limitations. Any number of computers can be used to provide the desired level of redundancy and the interrogation procedure can be modified accordingly. Any number or type of network links can be used to provide the desired level of redundancy and the interrogation procedure can be modified accordingly.

The invention has been described through a preferred embodiment. However, modifications can be made without departing from the scope of the invention as defined by the appended claims.

What is claimed is:

1. A multiple port unit adapted for coupling one or more computers to multiple peripheral devices over a network, said multiple port unit comprising:

plural network ports, each of said network ports being configured to couple the multiple port unit to a computer via one or more hubs over a respective network link;

plural communication serial ports, each of said communication serial ports being configured to couple the multiple port unit to a peripheral device; and a control unit to interrogate the network links and to communicatively couple said communication serial ports to a selected one of said network ports based on the interrogation of the network links, the control unit further determining whether it is time to interrogate the network links; and the control unit interrogating the network links including checking an availability of a computer over each of the network links including comparing a single current time value received from the computer with a previous single time value received from the computer, wherein each of the single time values received from the computer reflects a period of time from a particular reference time of a day and wherein the control unit determines whether the computer is available solely on whether the current single time value is greater than the previous single time value;

wherein said network ports are configured to couple the multiple port unit to plural computers and wherein said control unit is configured to interrogate each of the plural computers and to select an active computer to control the peripheral devices based on the interrogation of the computers;

further wherein the control unit is configured to identify a network link as not operating properly based on the interrogation and to prevent further interrogation thereof for a preset period of time.

2. A multiple port unit as recited in claim 1, wherein said control unit interrogates the computers over each of the network links in an alternating periodic manner.

3. A multiple port unit as recited in claim 2, wherein said network ports comprise Ethernet ports.

4. A multiple port unit as recited in claim 3, wherein said communication serial ports comprise serial interfaces.

5. A multiple port unit as recited in claim 3, further comprising two redundant power supplies.

6. A multiple port unit as recited in claim 1, wherein said control unit is configured to interrogate the network links using a network carrier signal.

7. A multiple port unit as recited in claim 1, wherein said control unit is configured to interrogate the computers using Packet Internet Groper.

8. A multiple port unit as recited in claim 1, comprising two network ports and 8 communications ports.

9. A multiple port unit as recited in claim 1, further comprising a data bus coupled to said control unit, said network ports and said communication serial ports.

10. A multiple port unit as recited in claim 1, wherein the interrogation is effected by the control unit sending a packet.

11. A multiple port unit as recited in claim 1, wherein the interrogation of the network links relates to whether a particular network link is working properly.

12. A multiple port unit as recited in claim 1, wherein the control unit being further configured to determine whether it is time to interrogate the network links includes a determination if a preset time for switching network links has elapsed.

13. A multiple port unit as recited in claim 1, wherein said control unit communicatively couples said communication serial ports to the selected one of said network ports to avoid the network link not operating properly.

14. A method of coupling plural peripheral devices to computers, said method comprising the steps of:
   interrogating the status of plural network connections with a control unit of a multiple port unit having plural network ports coupled to the computers via one or more hubs over the plural network connections and plural communication serial ports coupled to peripheral devices, the control unit determining whether it is time to interrogate prior to performing the interrogation; and
   coupling the plural communication serial ports to one of the network connections based on the results of said step of interrogating the status of plural network connections; and
   the interrogating including checking an availability of a computer over each of the network links including comparing a single current time value received from the computer with a previous single time value received from the computer, wherein each of the single time values received from the computer reflects a period of time from a particular reference time of a day and wherein the availability of a computer is solely determined by whether the current single time value is greater than the previous single time value;
   interrogating the status of plural computers respectively coupled to the network connections; and controlling the peripheral devices based on the results of said step of interrogating the status of plural computers; and
   identifying a network link as not operating properly based on the interrogating and to prevent further interrogating thereof for a preset period of time.

15. A method as recited in claim 14, wherein said step of interrogating the status of plural network connections comprises detecting a carrier on each network connection.

16. A method as recited in claim 14, wherein said step of interrogating the status of plural computers comprises using Packet Internet Groper.

17. A method as recited in claim 14, further comprising the step of maintaining a record of the status of each computer and each network connection in the control unit.

18. A method as recited in claim 14, further comprising the step of transferring status data between the computers at the direction of the control unit.

\* \* \* \* \*

UNITED STATES PATENT AND TRADEMARK OFFICE
CERTIFICATE OF CORRECTION

PATENT NO. : 7,743,125 B1
APPLICATION NO. : 09/708492
DATED : June 22, 2010
INVENTOR(S) : Lau It is certified that error appears in the above-identified patent and that said Letters Patent is hereby corrected as shown below:

In Column 4, Line 30, delete "AU" and insert -- AUI --, therefor.

In Column 4, Line 53, delete "$10_1$" and insert -- 10 --, therefor.

Signed and Sealed this
Twenty-first Day of June, 2011

David J. Kappos
*Director of the United States Patent and Trademark Office*